May 12, 1953  F. BERRY  2,638,376
COMBINATION BUG AND AIR DEFLECTOR
Filed June 12, 1952
FIG. 1.
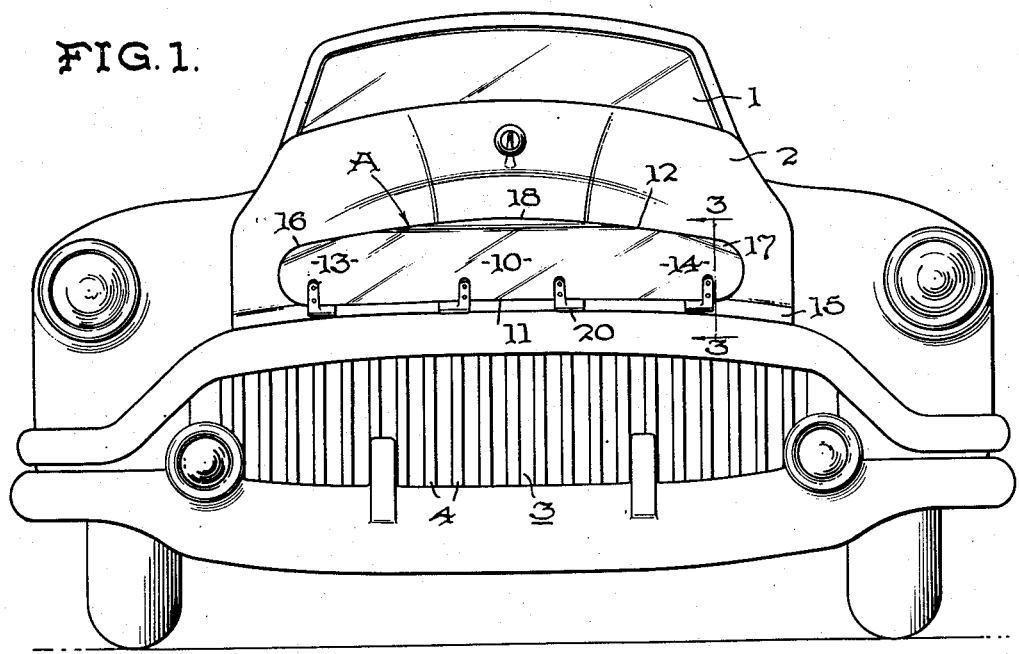
FIG. 2.
FIG. 3.
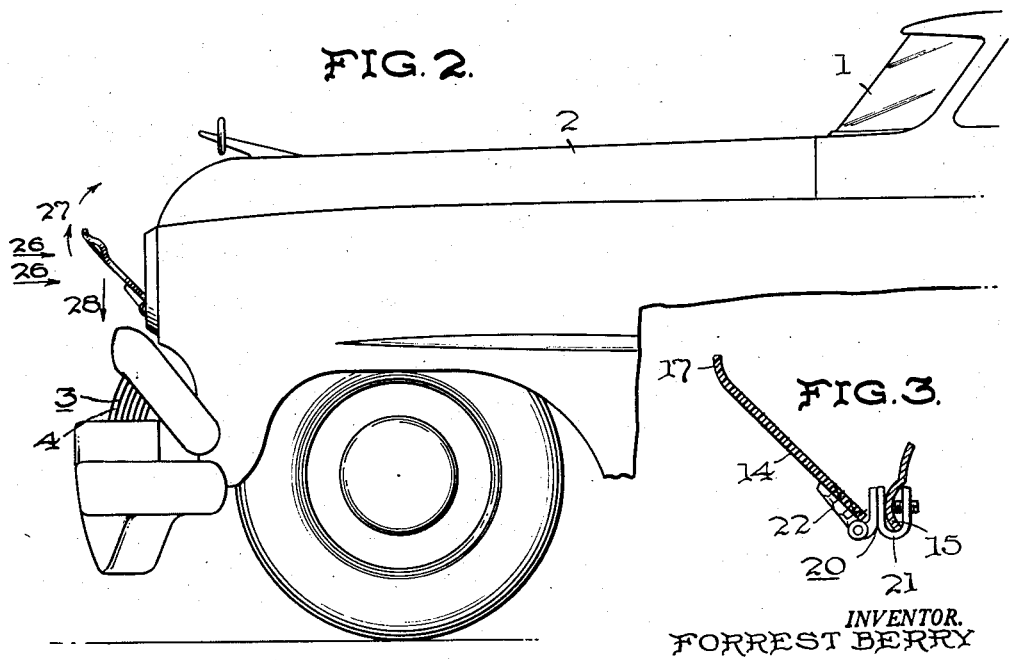
INVENTOR.
FORREST BERRY
BY
Leech & Radue
ATTORNEYS

UNITED STATES PATENT OFFICE 2,638,376

COMBINATION BUG AND AIR DEFLECTOR

Forrest Berry, Reading, Pa.

Application June 12, 1952, Serial No. 293,145

6 Claims. (Cl. 296—91)

This invention relates to deflectors as applied to automobiles, and more particularly to deflectors utilized for creating air currents which serve to deflect bugs, rain and snow away from the vehicle windshield and also to deflect air downwardly toward the vehicle grillwork to furnish additional cooling air to the radiator.

One object of this invention is the provision of a deflector suitable for use on a vehicle which will direct air upwardly and outwardly so as to deflect bugs and similar items away from the windshield and also force air downwardly toward the intake grill for radiator cooling.

Another object is the provision of a deflector which is so positioned on the forward part of a vehicle that it will not be in the line of vision of the driver.

The principal type of bug deflectors presently in use are so positioned on the vehicle that they extend upwardly above the hood to a considerable height. This can be quite annoying to the driver and perhaps even unsafe. Although these difficulties have been kept to a minimum by using transparent and appropriately tinted materials, the deflector still at certain times will obstruct the vision of the driver and possibly produce undesirable reflections. The deflector described herein has been devised to eliminate these problems. These difficulties have been eliminated by positioning the deflector below the top level of the hood on the forward portion of the vehicle. The device may conveniently be secured to or adjacent to the lower forward section of the hood.

This invention will be understood and its advantages more fully appreciated from the illustrative embodiment thereof described in the description and drawing wherein:

Fig. 1 is a front view of a motor vehicle showing the deflector mounted adjacent the lower edge of the hood thereof;

Fig. 2 is a side view showing the angular relationship of the deflector with respect to the grillwork and hood of the vehicle; and Fig. 3 is a vertical cross-section along line 3—3 of Fig. 1 showing the curvature of the end portion of the deflector and the manner in which the deflector is secured to the hood.

The present device is adapted to be used with the conventional automobile having a windshield 1, a hood 2 extending forwardly from the windshield and curved downwardly at the front and an air inlet 3 positioned beneath the front portion of the hood and protected by grillwork 4.

The deflector A is preferably formed of a sheet of transparent material although an opaque material would be just as serviceable since the deflector does not obstruct the driver's line of vision.

As shown in Fig. 1 the deflector A is made from a sheet 10 having a back edge 11 curved to conform to the shape of the lower portion 15 of the hood and a generally parallel front edge 12 curving slightly outwardly from the back edge so as to form a center section of increased width. The front and back edges blend into rounded end portions 13 and 14. The length of the sheet member A is shown to be approximately the same as the width of the front portion of the hood. The upper tips of the sheet are curved as at 16, 17 and 18 to present convex areas with respect to the forward face of the deflector so as to make the leading edges of these sections extend backwardly from the remainder of the active deflector face. This arrangement is clearly shown in cross-section in Fig. 3.

The deflector A is adjustably mounted on the vehicle hood along lower hood section 15 by means of brackets 20. As shown in Fig. 3, these brackets are of the conventional type each having a base 21 secured to the hood portion 15 by screws and having a friction pivot carrying an arm 22 having holes therein to receive fasteners for securing the deflector thereto. Any number of brackets may be used, in general four positioned as shown in Fig. 1 are adequate.

The deflector is adjustably mounted and held by the friction pivots so that the optimum operating angle may be used, depending on the contours and dimensions of the particular vehicle.

As shown in Fig. 2, the deflector is inclined upwardly and forwardly at approximately a 45 degree angle to the horizontal which has been found to be the best overall position. The arrows 26 indicate the direction of air striking the deflector when the car is in motion. The air striking the deflector is divided in two streams, respectively, diverted upwardly and downwardly as shown by arrows 27 and 28. The upwardly flowing air forms a moving stream which acts to divert the incoming air which is level with the hood upwardly so that the bugs and other foreign material will be carried up and over the windshield. In addition the backwardly curved tips 16, 17 and 18 increase the divergence of the upwardly flowing air and eliminate turbulence in the air stream to increase the efficiency of the deflector. The downwardly flowing portion of the air stream serves to furnish additional air for cooling since it passes down in front of the grill work 4 and into the air inlet 3 to the radiator with the normal current of air flowing through this passage.

As will be apparent from the various figures of the drawing, the device is easy to attach to the vehicle. It may be attached as shown by brackets and screws which are readily accessible. The manner of mounting depends on the particular vehicle and the front hood and grillwork arrangement. The essential requirement is that the deflector A be positioned above the air inlet and below the top level of the hood at an angular relation to the horizontal such as to divert the air upwardly into a bug deflecting stream above the hood and a cooling stream down into the air inlet. Whatever mounting means is used its principal function is to position the deflector at the proper angle and intermediate the hood and grill.

I claim:

1. A combination bug and air deflector for an automobile having a windshield and a forwardly projecting hook extending downwardly at the front with an air inlet positioned beneath the forward lower edge thereof, comprising a sheet member having a back edge curved to conform to the forward lower edge of the hood, a front edge generally parallel to the back edge of the sheet member, and mounting means on the back edge portion of the sheet member adapted to position the deflector above the air inlet and at an angle to the horizontal such that a portion of the air striking the same is deflected upwardly and outwardly and another portion is deflected downwardly into the air inlet, the length of the sheet member being approximately the same as the width of the front portion of the hood, and the width thereof being such that the forward edge of the sheet member is below the top level of the hood.

2. A combination bug and air deflector for an automobile having a windshield and a forwardly projecting hood extending downwardly at the front with an air inlet positioned beneath the forward lower edge thereof, comprising a sheet member having a back edge curved to conform to the forward lower edge of the hood when the sheet memebr is inclined forwardly and upwardly at approximately a 45° angle to the horizontal, a front edge curving outwardly from the back edge to produce a center section of increased width, said center section having the front edge portion curved convexly forwardly, the front and back edges blending into rounded end sections, each of said end sections having the front edge portion curved convexly forwardly so as to give additional spread to the air striking the sheet member, and mounting means adapted to be affixed to the aforementioned forward lower edge of the hood to hold the sheet member at said angle whereby a portion of the air striking the same is deflected upwardly and outwardly and another portion is deflected downwardly toward the said air inlet, the length of the sheet member being approximately the same as the width of the front of the hood, and the width thereof being such that the forward edge of the sheet member is below the top level of the hood.

3. In combination, an automobile having a windshield, a hood projecting forwardly from the windshield and extending downwardly at the front, an air inlet positioned beneath the downwardly extending portion of the hood, a deflector, and means mounting the deflector above the air inlet, said means supporting the deflector in an upwardly and forwardly extending position such that a portion of the air striking the deflector will be diverted upwardly and outwardly so as to prevent bugs and other matter from striking the windshield, and another portion will be deflected downwardly into the air inlet, the length of the deflector being approximately the same as the width of the front lower portion of the hood, and the width thereof being such that the forward edge of the deflector is below the top level of the hood.

4. In combination, an automobile having a windshield, a hood projecting forwardly from the windshield and extending downwardly at the front, an air inlet positioned beneath the downwardly extending portion of the hood; a deflector having an upper center portion curved convexly forwardly, means mounting the deflector above the air inlet, said means positioning the deflector in an upwardly and forwardly extending position such that a portion of the air striking the same will be diverted upwardly and outwardly so as to prevent bugs and other matter from striking the windshield, the upper curved portion of the deflector serving to increase the diversion of this upwardly produced air current, and another portion of the air is deflected downwardly into the air inlet, the length of the deflector being approximately the same as the width of the lower front portion of the hood, and the width thereof being such that the forward edge of the deflector is below the top level of the hood.

5. In combination with an automobile having a windshield, a hood projecting forwardly from the windshield and extending downwardly at the front, an air inlet positioned beneath the downwardly extending portion of the hood, a deflector, means mounting the deflector above the air inlet, said deflector having a back edge curved to conform to the lower edge of the downwardly extending portion of the hood when the deflector is inclined upwardly and forwardly at approximately a 45° angle to the horizontal, a front edge curving outwardly from the back edge to produce a center section of increased width, said center section having the upper portion curved convexly forwardly, the front and back edges blending into rounded end sections, each of said end sections having the upper portion curved convexly forwardly so as to give additional spread to the air striking the deflector, said deflector being positioned at said angle whereby a portion of the air striking the deflector will be diverted upwardly and outwardly so as to prevent bugs and other matter from striking the windshield, and another portion will be deflected downwardly into the air inlet, the length of the deflector being approximately the same as the width of the front lower portion of the hood, and the width thereof being such that the forward edge of the deflector is below the top level of the hood.

6. In combination, an automobile having a windshield, a hood projecting forwardly from the windshield and extending downwardly at the front, an air inlet positioned beneath the downwardly extending portion of the hood, an elongated deflector having upper end portions curved convexly forwardly, means mounting the deflector above the air inlet, said means mounting the deflector in an upwardly and forwardly extending position such that a portion of the air striking the same will be diverted upwardly and outwardly so as to prevent bugs and other matter from striking the windshield, the upper end portions of the deflector serving to increase the diversion of this upwardly produced air current, and another portion of the air is deflected downwardly into the air inlet, the length of the deflector being approximately the same as the width of the lower front portion of the hood, and the width thereof being such that the forward edge of the deflector is below the top level of the hood.

FORREST BERRY.

References Cited in the file of this patent

UNITED STATES PATENTS

| Number | Name | Date |
|---|---|---|
| D. 163,272 | Glass | May 15, 1951 |
| 2,229,516 | Metzger | Jan. 21, 1941 |